M. C. SCHWEINERT.
RIM NUT.
APPLICATION FILED OCT. 31, 1919.

1,398,604. Patented Nov. 29, 1921.

WITNESS:
Rene' Muine

INVENTOR:
Maximilian Charles Schweinert
By Attorneys,
Fraser, Durk & Myers

UNITED STATES PATENT OFFICE.

MAXIMILIAN CHARLES SCHWEINERT, OF WEST HOBOKEN, NEW JERSEY.

RIM-NUT.

1,398,604. Specification of Letters Patent. Patented Nov. 29, 1921.

Application filed October 31, 1919. Serial No. 334,802.

*To all whom it may concern:*

Be it known that I, MAXIMILIAN CHARLES SCHWEINERT, a citizen of the United States of America, residing in West Hoboken, in the county of Hudson and State of New Jersey, have invented certain new and useful Improvements in Rim-Nuts, of which the following is a specification.

This invention relates to rim nuts for tire valves or the like and aims to provide certain improvements therein.

The invention is particularly directed to rim nuts for tire valves which are adapted to engage a dust cap or the like.

The invention comprises generally a nut, preferably hexagonal in form with an extension for engaging the tire valve casing, and a recessed portion for receiving a washer. The invention includes other features of construction which will be hereinafter more fully described.

Referring to the drawings which illustrate one form of the invention,—

Figure 1:
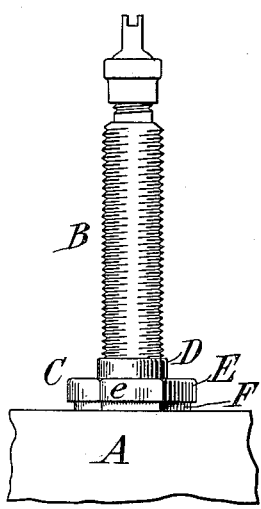
Figure 1 is a side view of the nut mounted on a valve casing.
Figure 2:
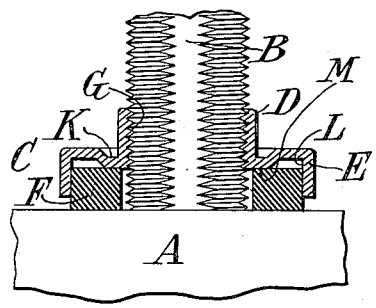
Fig. 2 is an elevation showing the nut in cross-section on an enlarged scale.
Figure 3:
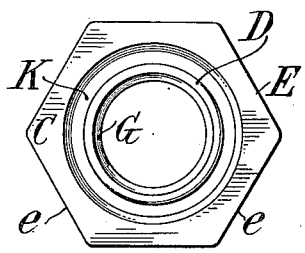
Fig. 3 is a plan view of the nut.
Figure 5:
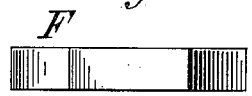
Fig. 5 is a side view of the washer.
Figure 6:
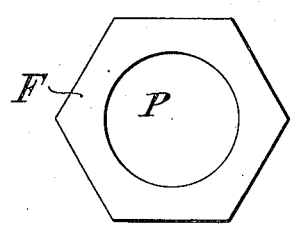
Fig. 6 is a plan of the washer.
Figure 4:
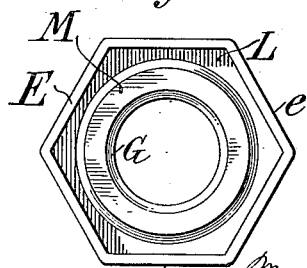
Fig. 4 is an underside view with the washer removed.

Referring to the drawings, let A indicate a wheel felly or rim, B, a valve stem or casing, and C, the nut as a whole. D is an extension of the nut forming a neck which is screw-threaded as at G to engage the threads on the valve stem B. E is the body of the nut which is recessed or cupped as at L, and which has wrench faces $e, e$. The top of the nut is pressed annularly inward, forming on the exterior a circular groove K, and on the interior, an annular projection M. The groove K is adapted to receive the lower edge of a dust cap. The interior projection M forms an abutment which constitutes a bearing face or seat for the washer. The washer F is made of rubber, leather or any other suitable material and is cut to fit the recessed portion of the nut. The washer F has an opening P which coincides with the opening through the nut.

The washer F is placed in the recessed portion of the nut against the seat M and the whole is screwed down over the valve stem into contact with the rim, thus securing the valve stem and holding it fast. The nut may be finally tightened by applying a tool to the wrench faces. The washer, which protrudes below the lower edge of the nut, forms a bearing on the rim, which will not cut into the wood but which will at the same time grip the rim firmly and prevent slipping of the nut. A dust cap may then be screwed over the tire valve into contact with the groove K, which has the usual function of such a groove, forming a frictional bearing with the dust cap and preventing it from working loose.

Heretofore, such rim nuts have commonly been made in two pieces, namely, an outer body and an inner filling, forming a seat for the washer. By the present invention, the body portion of the nut is made shallower than before and the seat for the washer is formed integrally with the cupped portion, being afforded by the pressed-in annular bearing M.

While one embodiment of the invention has been shown and described, it is to be understood that the invention is not limited to this precise construction, since various changes may be made therein without departing from the spirit of the invention.

What I claim is:

1. A sheet metal nut having a body portion with top and sides, forming a recess within the sides, and the metal of the top pressed partly inward to form a bearing seat within the recess.

2. A sheet metal nut having a body portion with top and sides, forming a recess within the sides, the metal of the top being pressed partly inward to form a continuous annular bearing seat within the recess.

3. A sheet metal nut having a body portion with top and sides forming a recess within the sides, the metal of the top being pressed partly inward to form a bearing seat within the recess, and an external groove.

4. A sheet metal nut having a body portion with top and sides, forming a recess within the sides, an outward extension and an external groove encircling said extension.

5. A sheet metal nut having a body portion with top and sides, forming a recess within the sides, and an outward extension, said extension being internally threaded, the metal of the top surrounding said extension being pressed partly inward to form a continuous annular bearing seat within the recess.

In witness whereof, I have hereunto signed my name.

MAXIMILIAN CHARLES SCHWEINERT.